(12) United States Patent
Burmester

(10) Patent No.: US 9,423,035 B2
(45) Date of Patent: Aug. 23, 2016

(54) DRIVE FOR SWITCHING A DOUBLE SEAT VALVE

(71) Applicant: GEA Tuchenhagen GmbH, Büchen (DE)

(72) Inventor: Jens Burmester, Grambek (DE)

(73) Assignee: GEA Tuchenhagen GmbH, Büchen (DE)

( * ) Notice: Subject to any disclaimer, the term of this patent is extended or adjusted under 35 U.S.C. 154(b) by 90 days.

(21) Appl. No.: 14/362,318

(22) PCT Filed: Nov. 28, 2012

(86) PCT No.: PCT/EP2012/004899
§ 371 (c)(1),
(2) Date: Jun. 2, 2014

(87) PCT Pub. No.: WO2013/079190
PCT Pub. Date: Jun. 6, 2013

(65) Prior Publication Data
US 2014/0311600 A1    Oct. 23, 2014

(30) Foreign Application Priority Data
Dec. 3, 2011   (DE) .................. 10 2011 120 287

(51) Int. Cl.
*F16K 1/44*      (2006.01)
*F16K 31/122*    (2006.01)

(52) U.S. Cl.
CPC ............. *F16K 1/446* (2013.01); *F16K 31/1225* (2013.01); *Y10T 137/87917* (2015.04); *Y10T 137/88038* (2015.04)

(58) Field of Classification Search
CPC ....... F16K 1/446; F16K 31/1225; F16K 1/44; F16K 1/443; F16K 31/1221; F16K 25/02; Y10T 137/87917; Y10T 137/88038; Y10T 137/4259; Y10T 137/88046; Y10T 137/8803; Y10T 137/87121; Y10T 137/4245; Y10T 137/0424; Y10T 137/5762; F15B 15/24
USPC .......... 137/613, 614.18, 240, 614.17, 614.19, 137/238, 637.2, 15.05, 614.16, 614.21, 137/312; 251/62, 63, 63.5, 63.6
See application file for complete search history.

(56) References Cited

U.S. PATENT DOCUMENTS 6,014,983 A    1/2000  Sondergaard et al.
6,179,003 B1 *  1/2001  Burmester .............. F16K 1/446
                                                    137/613

(Continued)

FOREIGN PATENT DOCUMENTS

DE        31 33 273  A1    3/1983
DE        35 01 739  C1    4/1986

(Continued)

*Primary Examiner* — Michael R Reid
(74) *Attorney, Agent, or Firm* — Vidas, Arrett & Steinkraus, P.A.

(57) ABSTRACT

A drive for shifting a cleanable-seat double seat valve. A first drive piston is fixedly connected to a first adjusting rod. The drive can be used in two configurations, wherein •either the first drive piston from the closed position of the double seat valve out under a first individual adjustment device for a first closing element about a first partially open position against the direction of the open position is axially displaceable, •or in the housing base on the side of the first drive piston is a second drive piston is provided which is around the first partial lift in the direction of the open position for engagement in a driving connection with the first drive piston.

12 Claims, 9 Drawing Sheets

(56) References Cited

U.S. PATENT DOCUMENTS

| | | | |
|---|---|---|---|
| 7,032,878 B2 * | 4/2006 | Coura | F16K 31/003 137/554 |
| 2006/0108550 A1 * | 5/2006 | Burmester | F16K 1/446 251/62 |
| 2011/0197985 A1 * | 8/2011 | Fontenit | F16K 1/446 137/625.19 |
| 2011/0309282 A1 * | 12/2011 | Wiedenmann | F16K 31/122 251/324 |

FOREIGN PATENT DOCUMENTS

| | | |
|---|---|---|
| DE | 40 14 474 C1 | 1/1992 |
| DE | 196 42 181 A1 | 4/1997 |
| DE | 10 2006 039 493 A1 | 3/2008 |
| EP | 0 866 934 B1 | 7/1997 |
| EP | 1 725 795 B1 | 5/2008 |
| WO | 02/093058 A1 | 11/2002 |
| WO | 2005/093298 A1 | 10/2005 |

* cited by examiner

DRIVE FOR SWITCHING A DOUBLE SEAT VALVE

CROSS-REFERENCE TO RELATED APPLICATIONS

This is a national stage application of PCT/EP2012/004899, filed on Nov. 28, 2012, which claims priority to DE 10 2011 120 287.4, filed on Dec. 3, 2011.

STATEMENT REGARDING FEDERALLY SPONSORED RESEARCH

Not applicable.

BACKGROUND OF THE INVENTION

The invention relates to a drive for switching a double seat valve, more particularly a double seat valve capable of seat cleaning, having two closing elements that are movable independently of each other, which enclose a leakage cavity between themselves that is connected to the surrounding area of the double seat valve, wherein the first closing element after a partial stroke comes into abutment on the second closing element and this with the further opening movement thereof also transfers into an open position, with adjusting rods for the closing elements arranged concentrically in each other, which are guided from a valve housing outward into and out of the drive and via which the closing elements, in addition to the open position, can each be brought selectively and independently of each other into a partially open position, wherein the open position is generated by a main adjusting arrangement and the partially open positions are generated by the individual adjusting arrangements assigned to the respective closing element, and the individual adjusting arrangements are arranged on the one hand between the main adjusting arrangement and the valve housing and on the other hand are arranged together with the main adjusting arrangement in a common housing of the drive, having a first drive piston of the main adjusting arrangement that engages in the direction of the associated open position at the first adjusting rod for the first closing element against the force of a first spring, and having a third drive piston of the second individual adjusting arrangement for the second closing element, which can be brought in engagement in the direction of the associated second partial opening in driving connection with a second adjusting rod of the second closing element, wherein the first drive piston on the side thereof facing the valve housing is delimiting a first pressure medium chamber for generating the fully open position, and on the side of the third drive piston facing away from the first pressure medium chamber has a third pressure medium chamber for generating the second partial opening.

A generic drive for closing a double seat valve is known from the document EP 1 725 795 B1. This drive supplied with pressurizing medium which is formed as a spring-piston drive, can be inserted in two configurations, and specifically in a first configuration that is suitable for actuating a double seat valve capable of seat cleaning, having a first closing element formed as a slide piston and a second closing element formed as a seat plate. The second configuration is suited for actuating a double seat valve capable of seat cleaning having two closing elements formed as seat plates. With the first configuration, the two partially open positions are oriented in opposing directions, and with the second configuration the two partially open positions are oriented in the same direction. With both configurations, the completely open position and the second partially open position of the second closing element have the same orientation. Both configurations are formed having identical structural components, wherein in both configurations the first partial opening of the first closing element is generated respectively by a spreading movement of the first and the second drive pistons. With the first configuration, the first drive piston is arranged limited axially movable on the first adjusting rod, and the second drive piston is fixed immovably on the first adjusting rod. With the second configuration, the arrangement relationship of the two drive pistons on the first adjusting rod is reversed. The first drive piston of a main adjusting arrangement is moved against the force of a spring for the completely open position, wherein this spring is arranged on the side of the first drive piston facing away from the valve housing. Due to this arrangement of the spring, the drive is extended by an additionally needed axial construction space, which is due to accommodating the pretensioned spring, in the direction of fully opened stroke performed therein via the first drive piston.

With a drive for a double seat valve capable of seat cleaning described in the document EP 0 866 934 B1, that is only suitable for the second configuration of the drive described above, the spring, against which the drive piston of the main adjusting arrangement is transferred into the completely open position, is arranged in the same manner, necessarily enlarging the drive as in the document EP 1 725 795 B1.

The two known drives described above have a control head or a control unit, which is enclosed preferably by a separate housing, on the face side facing away from the valve housing of the double seat valve. This arrangement of the control unit requires an elongation of the first adjusting rod into the control unit, if there is to be position sensing of the independently driven first closing element. A position sensing of the dependently driven second closing element is not possible in a control unit arranged in this regard. In addition to the disadvantage of elongating the first adjusting rod into the control unit, there is the further disadvantage that a thusly arranged control unit enlarges the axial construction length of the double seat valve and the drive thereof.

Even with non-generic drives for double seat valves capable of seat cleaning found in the prior art, there is always the above described disadvantageous arrangement of the control unit. For example, the document DE 31 33 273 A1 discloses a so-called modularly built drive for a double seat valve which below the main adjusting arrangement for generating the closed and fully open position of the two closing elements, has two independently drivable individual adjusting arrangements for generating respectively a partially open position for each closing element, wherein the two individual adjusting arrangements together form a separate unit. Position indicating arrangements for the independently driven closing element are arranged in a separate housing on the face side of the main adjusting arrangement facing away from a valve housing. Furthermore, the pressure medium for pressurizing the main adjusting arrangement passes in relatively complex manner through a connection on the housing of the position indicating arrangement and then on the path via the adjusting rod into the main adjusting arrangement.

The document DE 40 14 474 C1 describes a drive, called a control head, for a disk valve, wherein there are two contactless signal transmitters spaced one above the other, above the control head in a cap resting on the latter, that report the closed or open position of the valve disk with the correspondingly displaced valve disk rod.

The document WO 02/093 058 A1 discloses a device for controlling the switching movement of a valve having at least one valve rod or adjusting rod translationally moved, supporting a closing element. The at least one valve rod, on one side of a valve housing, is guided out of the latter and guided into a drive pressurized with pressure medium, in which there is a main adjusting arrangement for generating the closed and fully open position of the valve and, if the valve is a double seat valve capable of seat cleaning, there are two individually controllable individual adjusting elements for generating in each case a partially open position for each closing element. In terms of control technology, the individual adjusting arrangements controls are interlocked so that only one closing element can take on a seat cleaning position. Here, the individual adjusting arrangements in addition to the main adjusting arrangement can be an integral component of the drive (so-called integral drive) or they supplement the main adjusting arrangement, either individually or together, in a modular design (modularly built drive). A control head is arranged on the face side of the valve housing facing away from the drive, which in a separate housing accepts at least one pilot valve for controlling the pressure medium, and additionally a position indicator that is connected to the valve rod of the independently actuatable closing element, and that detects the present position of the valve rod forming the valve rod movement, and delivers the present position indication of the valve rod in this respect, and accommodates means of control logic. The pilot valves are preferably electromagnetically actuatable auxiliary valves.

The document DE 10 2006 039 493 A1 discloses a double sealing valve with a so-called integrated drive unit which can bring the two independently movable closing elements from a closed position into a fully open position, and moreover each closing element selectively into a partially open position, wherein the partially open positions are interlocked in a manner described above. A control unit arranged on the face side of the drive unit facing away from a valve housing is formed such that within the control unit the position of both closing elements can be detected separately from each other. For this purpose, the adjusting rod, designed as a hollow rod, of the first (upper) closing element, and the adjusting rod, arranged therein, of the second (lower) closing element, are guided up into the control unit, where the respective position is detected by a plurality of assigned sensors. There is no information given in the document about the arrangement of pilot valves for controlling the pressure medium pressurizing the pressure medium chambers, however, it must be assumed that in this regard the pilot valves, for example, formed as electromagnetically actuatable auxiliary valves, are housed in the control unit, if the pressure medium for the pressure medium chamber to be controlled is not guided from the surrounding area to each of the valves, and is controlled by an externally arranged control.

Moreover, an arrangement for controlling pressure medium for a drive of a valve is known from the document DE 35 01 739 C1 which has a separate housing, which is arranged on the face side of the drive, not described in greater detail, facing away from a valve housing. In addition to an indicated position indicating device for the valve rod, a distributor piece is provided in the housing, that can control the pressure medium distribution necessary for standard and special functions of a valve if suitable auxiliary valves (pilot valves) are assigned to the distributor piece at various connections thereof.

The document DE 196 42 181 A1 discloses a control head for valves with a pneumatic drive for the food and beverage industry which is located in the same position to the drive as in the above-mentioned documents, and accommodates in the independent housing thereof means for connecting and distributing pneumatic lines, a solenoid valve or plurality of solenoid valves, possibly sensors for monitoring the position of the armature, and components of a control circuit. The valves at issue are pipeline switches in the broadest sense, the closing elements of which perform a pivot or stroke movement.

All of the drives described briefly above in conjunction with a valve and a control unit or control head, which describe the present state of the art of drives for valves, in particular double seat valves of process technology, particularly in the field of food and beverage industry, chemical, pharmaceutical and biotechnology, have in common the fact that the overall construction height or length of all these components results in the most unfavorable case from an addition of these lined up components. In general, the resulting total length is even greater because an obligatory so-called lantern housing with drainage function must be arranged between the valve housing and the drive so that in the event of leakages at the valve housing and/or at the drive, no contamination or mixing can occur between hostile fluids, the pressure medium in the drive and a product in the valve housing.

Large structural dimensions in process plants with a variety of valves require corresponding construction spaces that are not available in many cases, or the provision thereof causes corresponding costs. The efforts so far, to build the components of lantern, drive and control unit compactly and in a space-saving manner, at least in the direction of the required sequence thereof, i.e., in the axial direction of the drive, are insufficient.

It is an object of the present invention to further develop a generic drive for switching a double seat valve, so that this drive for actuating a double seat valve having a closing element (first configuration of the drive) formed as a slide piston and a closing element formed as a seat plate, or having two closing elements formed as seat plates (second configuration of the drive), are equally suitable and in the design thereof are simplified with respect to the construction known from the prior art. In addition, a further object of the invention is to simplify the aggregation of the drive and control unit in the design thereof and to significantly reduce the construction height of the aggregation, as measured in the axial extension direction of the aggregation compared in this respect to that known from the prior art.

BRIEF SUMMARY OF THE INVENTION

The innovative fundamental idea consists in giving only the first drive piston in each of the two configurations, in addition to the degree of freedom of movement in accordance with the full opening stroke, an additional limited degree of freedom of movement in accordance with the respective first partial stroke T1, either in the direction towards or against the fully open position H. This is achieved for both configurations in that the first drive piston is securely connected either directly or indirectly to the first adjusting rod, and that the first pressure medium chamber that is delimited on the one side by the first drive piston, is delimited on the other side by a housing floor that spans the interior of the housing transverse to the longitudinal axis of the drive. Here, with the second configuration of the drive, the first partial stroke T1 is generated caused by a second drive piston, which can be brought to engage in a driving connection with the first drive piston in the direction toward the fully open position H. With the first configuration of the drive, the second drive piston is omitted without replacement, and the first drive piston is axially movable by the partial stroke T1 in the direction opposite to the fully open position H.

Due to the arrangement according to the invention of the first drive piston with respect to the first adjusting rod and to the housing floor, the space between the housing floor and the valve housing, starting from the housing floor, is now available for the first time for accommodating the first spring. With the known generic drive, the first spring is arranged on the side of the first drive piston facing away from the valve housing, and thus increases the construction height of the drive by the maximum insertion length of the first spring.

In order to significantly reduce the construction height of the drive, measured in the axial extension direction of the drive, compared in this respect to that known from the prior art, a proposal according to the invention provides that the first spring is arranged between the housing floor and the valve housing, and in each case engages directly or indirectly on the one side on the housing floor and on the other side on the first adjusting rod.

A further innovative fundamental idea, which on its own represents an independent invention, consists in moving the entire control unit, specifically having a minimum up to a maximum configuration with components, depending on the respective application case, of the type considering the relevant documents to the state of the art mentioned above, from its previously taken position on a face side of the drive facing away from the valve housing, into a less dimensionally-critical region of the drive, without the control unit influencing the construction height of the drive. Here, a spatial region is used, which until now remained unused and furthermore, this results in shorter supply and distribution paths for the pressure medium from a central pressure medium connection via the at least one auxiliary valve (pilot valve) up into the at least one now directly adjacent pressure medium chamber. A proposal of the invention provides in this respect that the housing is formed in the housing section thereof facing the valve housing, by a control unit, which itself in the axial extension region of the drive forms a radially outer part. The control unit is suitable to receive from minimally equipped to fully equipped auxiliary valves for controlling the pressure medium (first control means), and means for detecting position or distance measurement (second control means). Furthermore, the proposed embodiment of the control unit is applicable to double seat valves having only second and not the first control means in the control unit, and in which the pressure medium is controlled in an external control unit, and further to double seat valves having only the first and not the second control means.

A proposal provides that the control unit is positioned within the greatest outer radial dimension of the drive, wherein this dimension is generated alone from the drive-specific components of the drive, so that the arrangement of the control unit provided by the invention, in all the above mentioned applications, does not necessarily increase a certain greatest outer radial dimension of the drive determined solely by drive-specific components, and so that the desired reduction in the overall height of the drive in conjunction with the control unit does not compromise the radial dimensions of the drive.

Drive-specific components are understood to be components that mechanically define the kinematics of the drive, that is, not the aforementioned first and second control means that are generally combined in the separate control unit.

According to a further proposal, an improved utilization of the installation space of the drive occupied by the features of the solution according to the invention is provided when the control unit is annular. An optimal utilization of the above-mentioned construction space is obtained when the annular control unit, as is also provided, is designed closed in itself. In this case, the entire peripheral, radially outward-side region of the drive is available for the control unit, thereby resulting simultaneously also in the possibility to assign the components of the control unit and those of the drive with the shortest possible distance to each other in the necessary manner, to connect them, and/or to let them communicate with each other.

An advantageous embodiment of the proposed arrangement is obtained when the control unit is arranged on the side facing the valve housing of the first drive piston, and there is connected with a housing floor in a form-locking and/or friction-locked manner. Thus, the annular control unit remains within the greatest outer radial dimensions of the first working piston, which is usually the largest diameter drive piston when further drive pistons of individual adjusting arrangements must be provided. The connection between the housing of the drive and control unit is made preferably in a form-locking and friction-locked manner, for example in that firstly a unique and positive association between the housing and control unit is provided, and on the other hand the latter is additionally screwed to the housing floor or the housing.

Due to form-locking and/or friction-locked connection of the control unit to the housing floor or the housing of the drive proposed above, a construction space is available inside the annular controller, in which portion of the first spring, and a third actuating piston of the drive are arranged on the side of the housing floor facing the valve housing.

The control unit according to the invention creates, in a constructive surprisingly simple manner, the possibility that the control unit accommodates all connections and channels to control a pressure medium for pressurizing the at most four pressure medium chambers by at least one pilot valve, all connections, electrical lines, and signal lines of at least one means for position detection or distance measurement, and all means of control logic.

So that the fourth pressure medium chamber can be used for both generating the first partial stroke T1 in the first configuration of the drive and to generate an additional force to support the first spring in the context of the second configuration of the drive, a further proposal provides that a hollow rod is anchored in the first drive piston, which, starting from the first drive piston, penetrates the housing base slidably and sealingly, slidably engages a first blind hole in the control unit, and ends there; that an inner channel passing through the hollow rod connects the fourth pressure medium chamber to the first blind hole in a fluid passable manner, and that a fourth pressure medium can be supplied to the first blind hole.

Within the control unit according to the invention, a position detection and distance measurement of the first closing element can be performed easily, if, as is provided by a further proposal, a rod is firmly anchored in the first drive piston, that starting from the first drive piston, penetrates the housing floor movably and sealingly, slidably engages in a second blind hole in the control unit and ends there; and if the rod is assigned at least the first means for the position detection or distance measurement.

To optimally use the construction space made available by the control unit at the periphery and in the radially outside area of the drive space equally for all control components, it is further provided that the hollow rod and the rod are arranged diametrically on the first drive piston.

With the control unit according to the invention it is now possible, to realize the position detection or the distance measurement of the second closing element with very little expenditure in the control unit itself and not, as is customary in the art, using means in the area of the lantern housing, where the second shifting rod is accessible from the outside, or indirectly via the first control rod. In this regard, the invention provides that a third means for position detection or distance measurement, arranged in the control unit, is assigned to the drive-side end of the second adjusting rod.

BRIEF DESCRIPTION OF THE SEVERAL VIEWS OF THE DRAWINGS

A detailed representation of the invention is given in the following description and the accompanying figures of the drawing and from the claims. While the invention is implemented in various embodiments of a drive for switching a double seat valve capable of seat cleaning, in the drawings the features of the invention are represented in the two different configurations of the drive, namely, a drive for a double-seat valve capable of seat cleaning with two closing elements formed as seat plates (second type of valve, second configuration of the drive) and a double seat valve capable of seat cleaning having a closing element formed as a slide piston and a closing element formed as a seat plate (first valve type, first configuration of the drive), and described below according to the design and function. The drawings show:

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
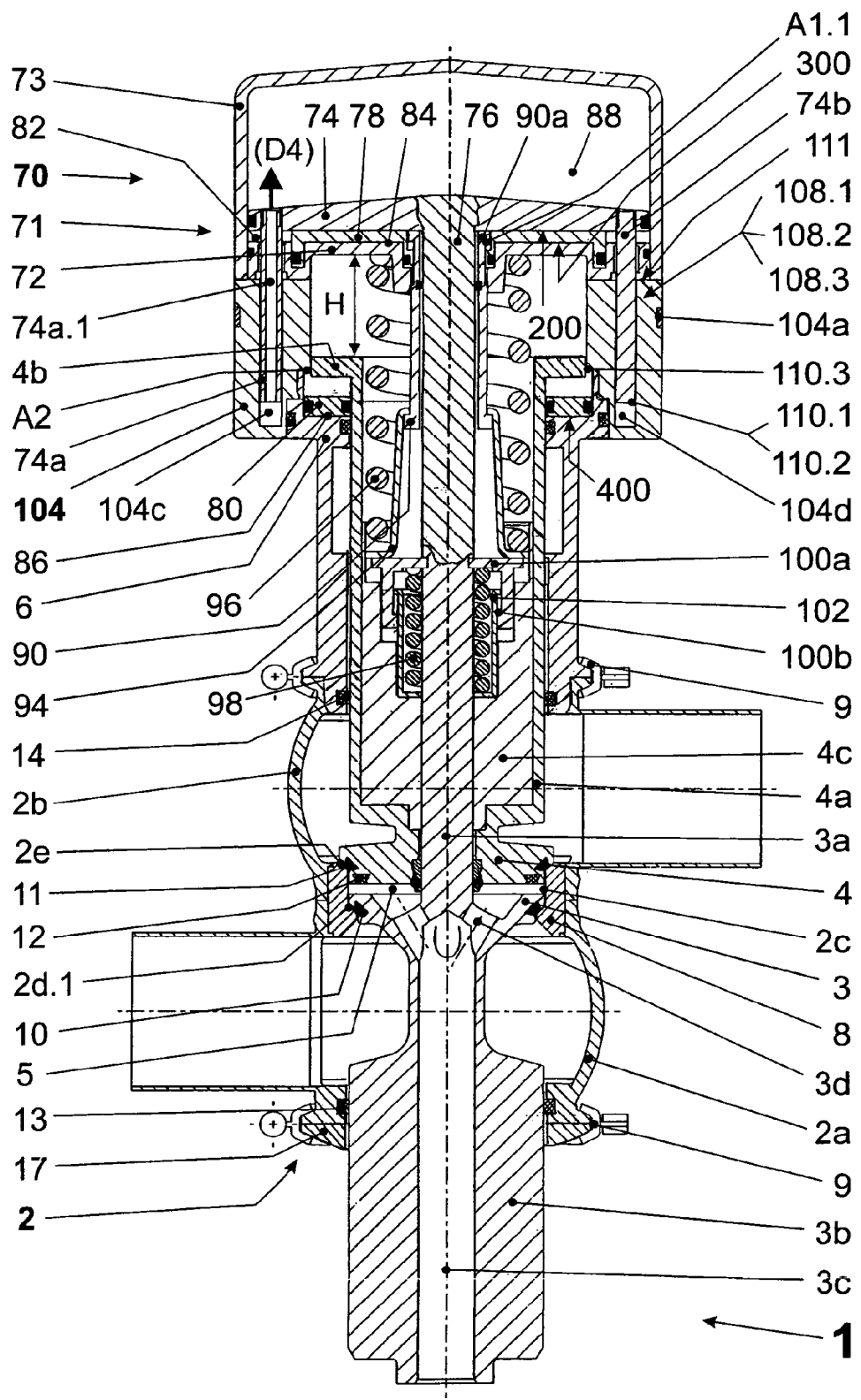
FIG. 1 a double seat valve, in a meridian section, capable of seat cleaning of the second valve type in the closed position thereof having a drive and a control unit according to the invention integrated therein.

A double seat valve 1 capable of seat cleaning of the second valve type in connection with a drive 70 according to the invention, in the closed position thereof, is represented in FIG. 1. The valve has two closing elements 3, 4 arranged serially and movable relative to each other, each formed as a seat plate, which in the closed position of the double seat valve 1 prevent the overflow of fluids from a valve housing part 2a, 2b of a valve housing 2 into the other 2b, 2a due to connection opening 2c connecting together these valve housing parts 2a, 2b, and which delimit both in the closed position as well as in an open position a leakage cavity 5, which is connected to the surroundings of the double seat valve 1.

The leakage cavity 5 is connected to the surroundings via at least one connection opening 3d in the first closing element 3, which opens into a drainage hole 3c of a tube shaft 3b arranged on the first closing element 3.

Figure 1A:
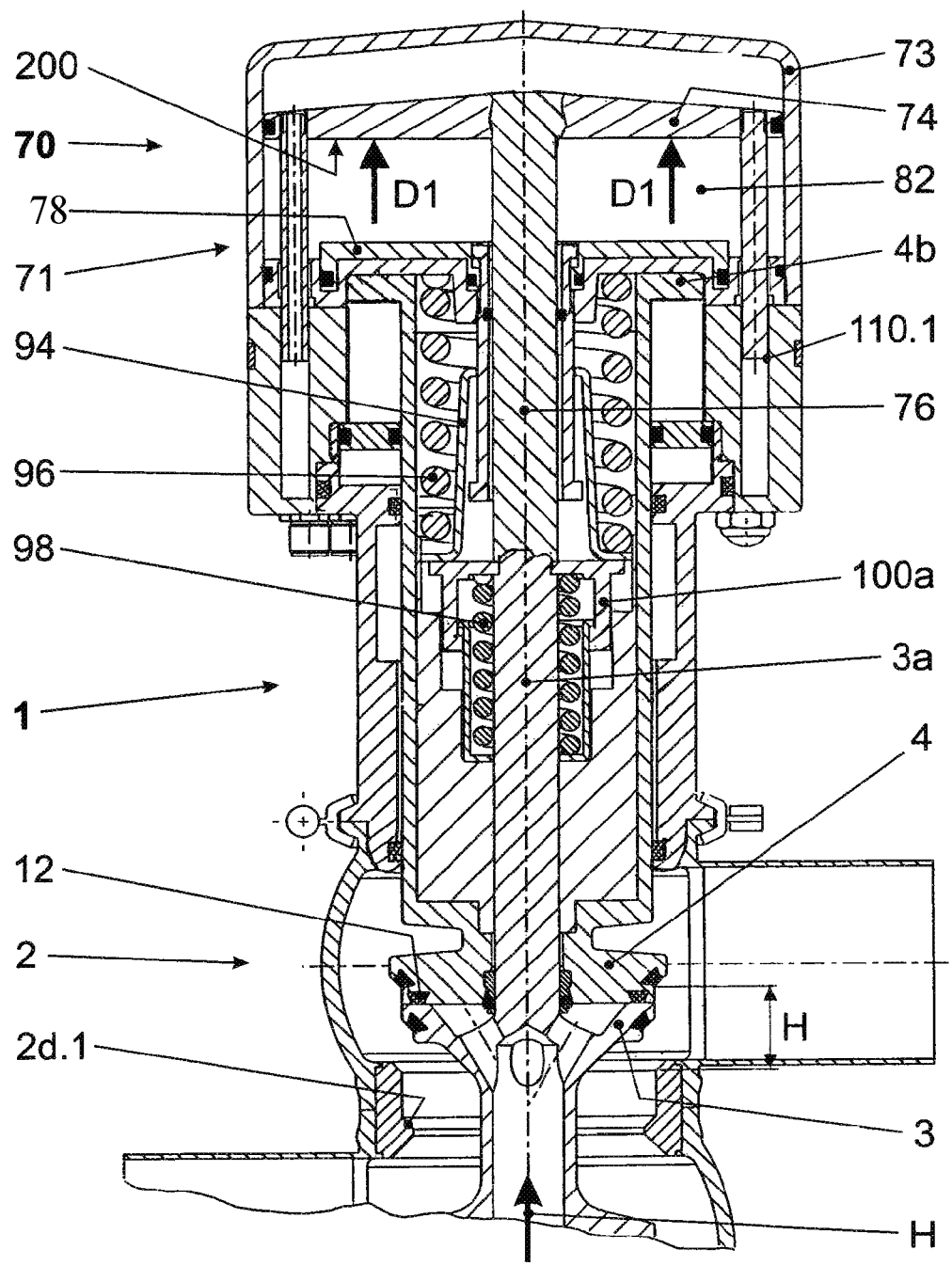
FIG. 1a the double seat valve according to FIG. 1, also in a meridian section, in the open position thereof, having an appropriately actuated drive and a control unit according to the invention.

In the closed position, the first closing element 3 interacts via a first seat seal 10 with a first seat 2d.1, which is provided in the connection opening 2c connecting together the valve housing parts 2a, 2b. The connection opening 2c can be formed directly in the first and/or in the second valve housing part 2a, 2b, or indirectly in a seat ring 8, which is embedded in the valve housing parts 2a and/or 2b in a form-locking and/or bonded manner. The first closing element 3, in the course of the opening movement thereof, comes into sealing abutment at the second closing element 4, and during the further opening movement transfers the latter also into an open position, which ends at the end of the opening procedure in a completely open position H (FIG. 1a). The second closing element 4 interacts via a second seat seal 11 with a second seat 2e, and a middle seal 12, arranged in the face side of the second closing element 4, which is facing toward the first closing element 3, provides in each partially open position of both closing elements 3 and 4, and up until the fully open position H, a seal of the closing elements 3, 4 with respect to each other, and thus also a secure seal of the leakage cavity 5 with respect to the interior spaces of the valve housing parts 2a, 2b connected to each other.

The tube shaft 3b can be formed, as shown as an example, as a first pressure compensation piston and is guided, sealed via a first housing ring 17, in the first valve housing part 2a out into the surroundings, wherein the seal with respect to the first valve housing part 2a is provided by means of a first rod seal 13, and the guidance in the housing ring 17 by means of a guide ring, not shown. The tube shaft 3b in the form of a first pressure compensation piston is generally dimensioned so that the outer dimension thereof corresponds approximately to the outer dimension of the cross-section enclosed by the first seat seal 11. The connection of the housing ring 17 to the first valve housing part 2a is by means of a clamping ring 9.

Figure 2:
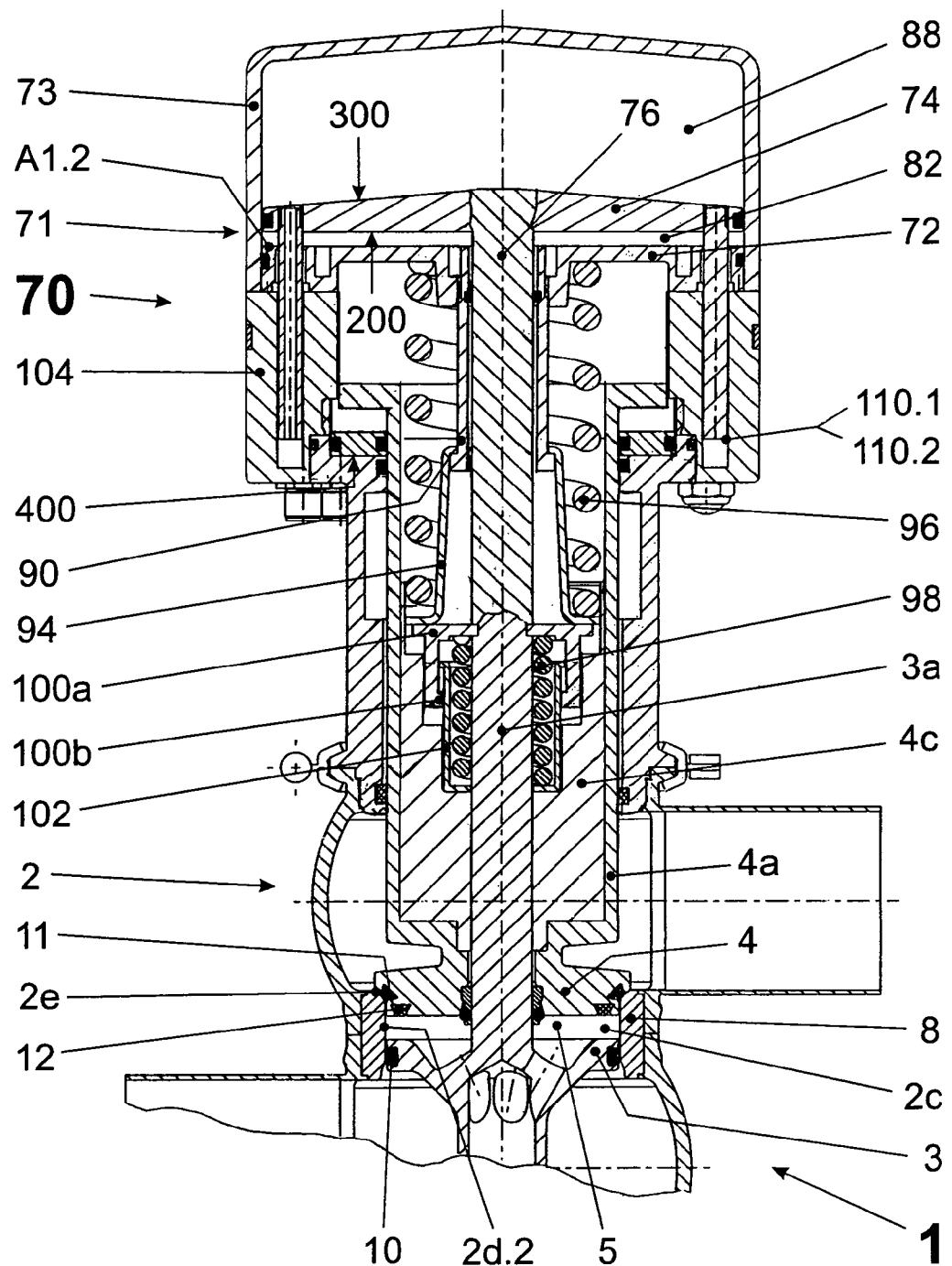
FIG. 2 a double seat valve capable of seat cleaning, in a meridian section, of the first valve type in the closed position thereof with a drive and a control unit according to the invention.
Figure 2A:
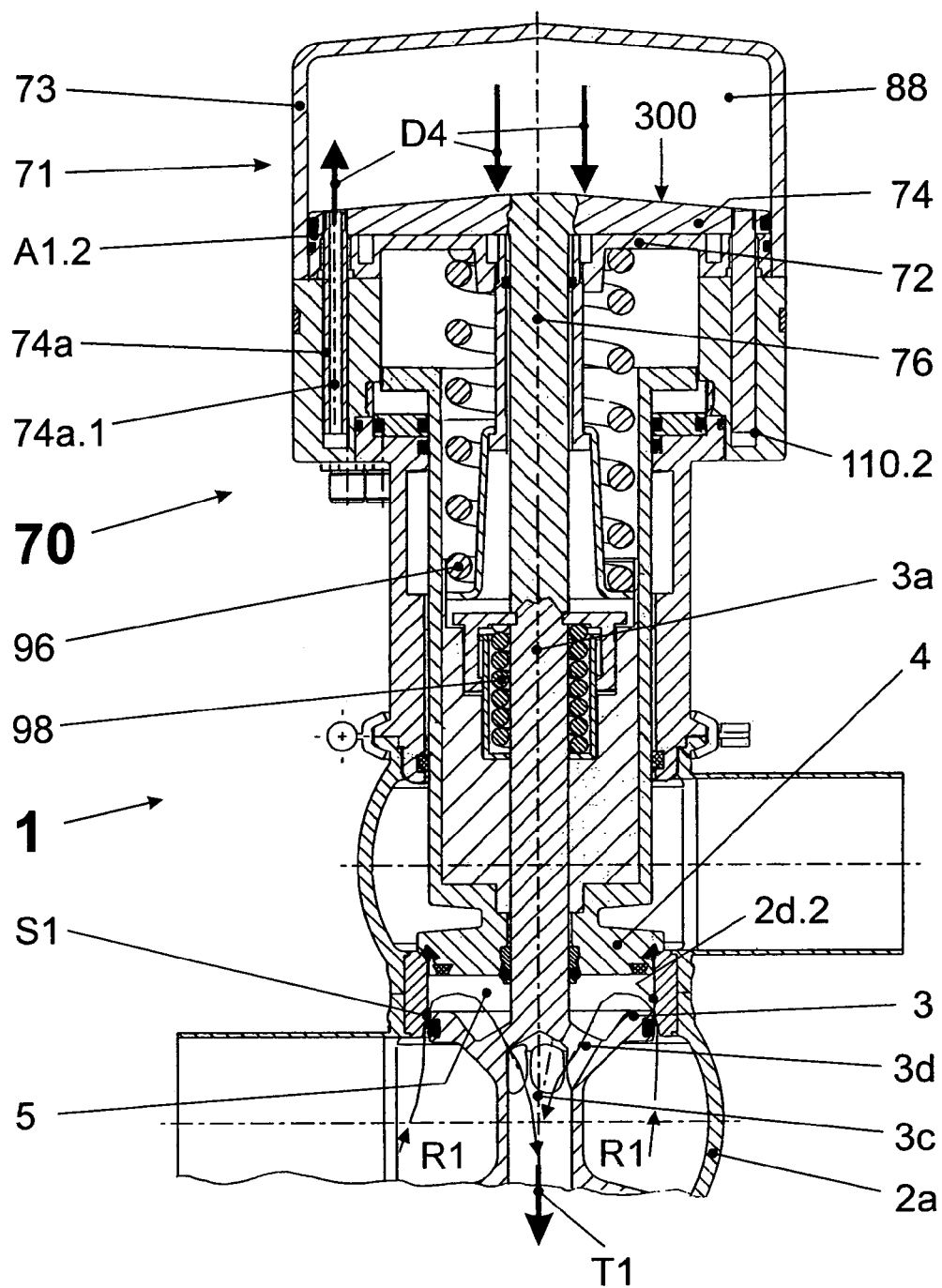
FIG. 2a the double seat valve according to FIG. 2, also in a meridian section, in a seat cleaning position of the first, relative to the represented location, lower closing element thereof, having the respectively actuated drive and the control unit according to the invention.
Figure 2B:
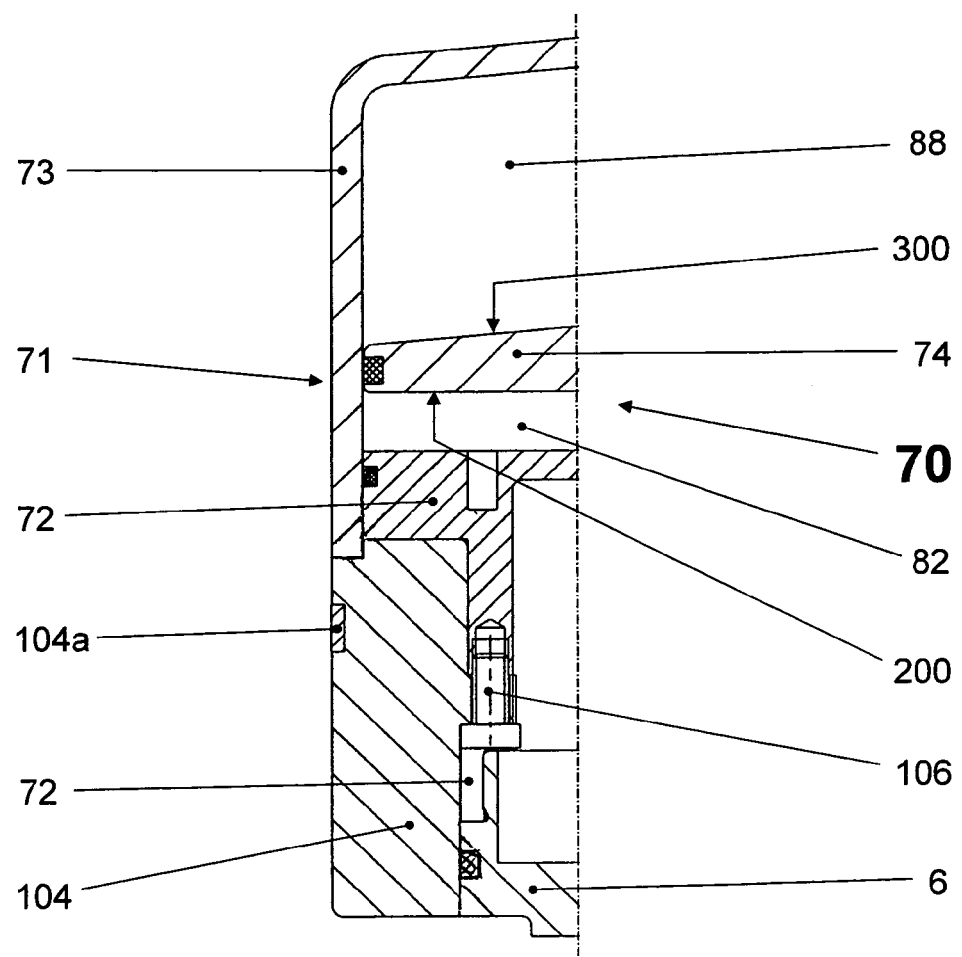
FIG. 2b also in a meridian section, a section from the drive of the double seat valve in connection to a lantern housing according to FIG. 2 in a section position rotated with respect to the section position according to FIG. 2, from which the fastening of the control unit according to the invention to a housing floor of the drive can be seen.

The first closing element 3 is connected to a first adjusting rod 3a, and the second closing element 4 is connected, concentrically enclosing the latter, to a second adjusting rod 4a, formed as a hollow rod and preferably in the form of a second pressure compensation piston. The second pressure compensation piston is dimensioned according to the same criteria as that of the first pressure compensation piston, that is, that the outer diameter of the second pressure compensation piston corresponds approximately to the outer diameter of the cross-section enclosed by the second seat seal 11. The adjusting rods 3*a*, 4*a* on one side, are guided out of the second valve housing part 2*b* and on the path via an adjacent lantern housing 6, into the drive 70 according to the invention. The lantern housing 6 at the end thereof facing away from the second valve housing part 2*b* is securely connected to a housing floor 72 of the drive 70, preferably in a form-locking and friction-locked manner, for example by means of screws (FIG. 2*b*). In the region of the axial extension of the lantern housing 6, the first adjusting rod 3*a* is securely connected to the piston rod 76, wherein the latter penetrates the housing floor 72 in an indirectly sealed manner, and its other end is securely connected to a first drive piston 74 which it engages. The secure connection between the lantern housing 6 and the second valve housing part 2*b* is created, for example, by another clamping ring 9. The second adjusting rod 4*a* has its movable seal at the penetration location thereof into the second valve housing part 2*b* in a second rod seal 14 arranged there, it penetrates movably sealed via a seal, not described in more detail, the drive-side end of the lantern housing 6, and ends in the drive 70.

In the drive 70 according to the invention, which is bordered on the outside by a housing 71 (FIGS. 1*a*, 1), the first drive piston 74 and the end of the housing floor 72 facing the first drive piston, form between them a first pressure medium chamber 82 that can be pressurized with a first pressure medium D1, and that is radially delimited outside by a housing cover part 73. The first drive piston 74, housing floor 72 and the jacket region of the housing cover part 73, together with the delimited first pressure medium chamber 82, form a main adjusting arrangement 200 for generating the fully open position H. The opening movement of the double seat valve 1 is initiated from the represented closed position, and the fully open position H is attained when the first pressure medium D1 is supplied to the first pressure medium chamber 82 via a path that is not represented and designated.

The housing cover part 73 also, defining the space, stretches over the first drive piston 74, wherein the latter is simultaneously guided radially outside in the housing cover part 73 in a sealed manner, and a fourth pressure medium chamber 88 is formed between the first drive piston 74 and the housing cover part 73 (FIG. 1). The end of the housing floor 72 facing toward the first drive piston 74 transitions radially inside and in the direction of the lantern housing 6 into a sleeve 90, preferably securely screwed in, which is enclosed at the other, free end thereof by a movable sleeve 94 in a form-locking manner, such that the movable sleeve 94 is axially movable over the entire length of the fixed sleeve 90, however, at the free end of the sleeve 90 and in the direction of the lantern housing 6 arrives in abutment at the fixed sleeve 90. The end of the movable sleeve 94 facing away from the fixed sleeve 90, serves as a support for a first spring 96, preferably a helical spring, wherein the first spring 96 is supported on the other side in the radial inside region of the housing floor 72. The housing floor 72, the fixed sleeve 90, and the movable sleeve 94 thus form a so-called spring cage for the first spring 96, which pretensions the latter by a defined amount in the stop position of the movable sleeve 94 at the fixed sleeve 90. In the intermediate positions, the tension of the first spring 96 increases correspondingly with respect to the aforementioned pretension. In the represented closed position and in any other partially open position of the closing elements 3, 4 up to the fully open position H (FIG. 1*a*), the end of the movable sleeve 94 facing away from the fixed sleeve 90 is supported on a spring counter bearing 100*a*, arranged on the first adjustment rod 3*a*, such that the first spring 96 acts upon the first adjusting rod 3*a*, and thus the first closing element 3, with the respective pretension force thereof, always in the direction toward the first seat 2*d*.1.

On the face side of the housing floor 72 facing away from the first drive piston 74 according to the invention, a control unit 104 is arranged in the axial extension region of the drive 70, and forms a radial outside part of the same. This control unit 104 is preferably positioned within the greatest radial dimension of the drive 70, wherein this dimension is generated solely from the drive-specific components, i.e. components mechanically defining its kinematics. In the example embodiment this greatest radial dimension is specified by the outer diameter of the housing 71, which generally is determined by the diameter of the housing cover part 73, in which the first drive piston 74 is guided directly in an axially movable and sealed manner. The outer diameter of the control unit 104 is preferably dimensioned so that the control unit 104 and the housing cover part 73 merge together in a flush manner, and together form the housing 71.

The control unit 104 is preferably annular and implemented closed, and securely connected to the housing floor 72 preferably in a form-locking and friction-locked manner by means of fastening means 106 (FIG. 2*b*), for example, screws. It can be seen in the FIGS. 1 and 2*b* that the control unit 104, given the radial dimensioning constraints described above, on the one hand is securely connected to the housing floor 72, and on the other hand the end facing away from the valve housing 2 encloses the lantern housing 6.

Figure 1B:
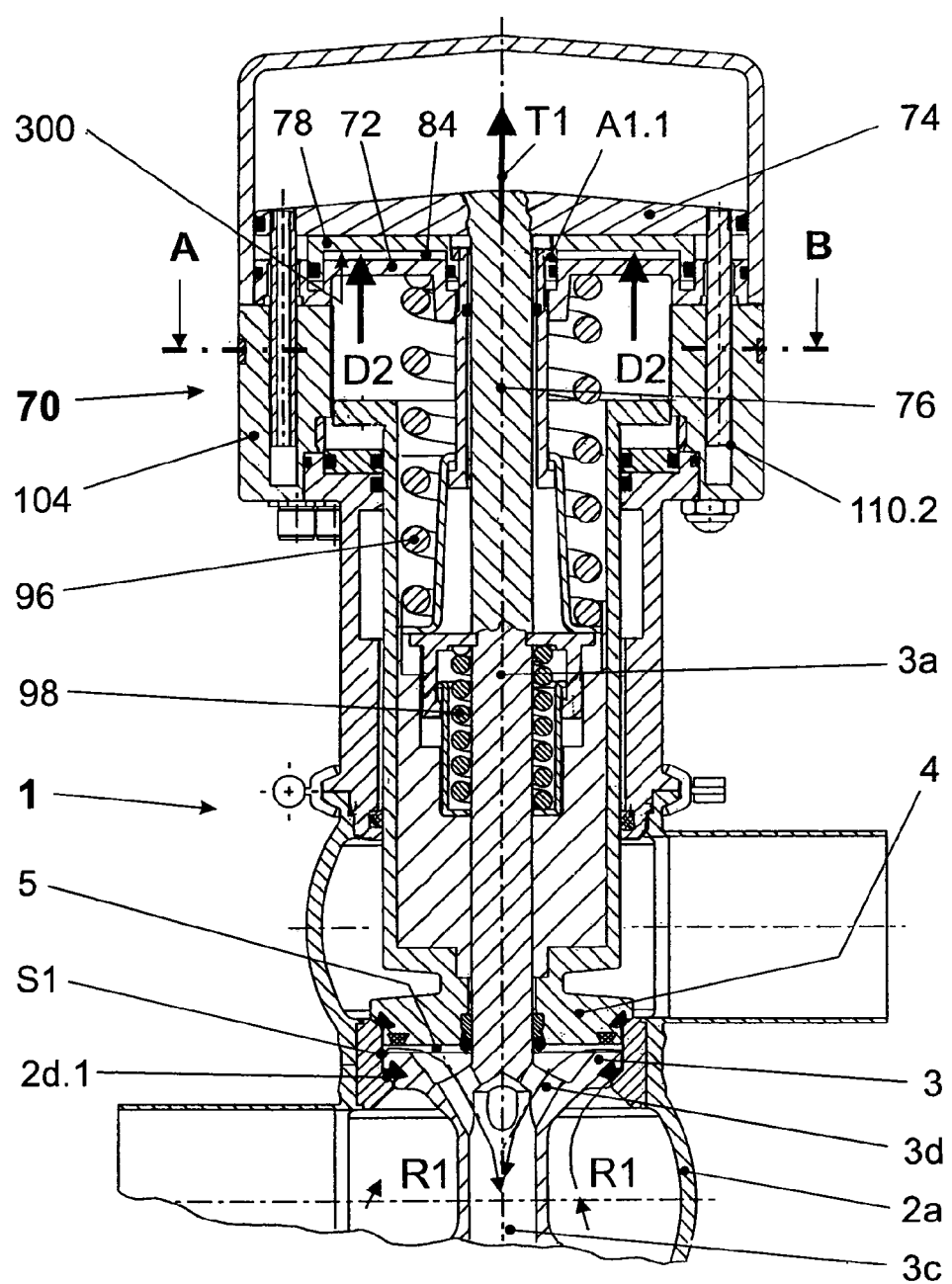
FIG. 1b the double seat valve according to FIG. 1, also in a meridian section, in a seat cleaning position of the first, relative to the represented position, lower closing element, with the respectively actuated drive and the control unit according to the invention.
Figure 1C:
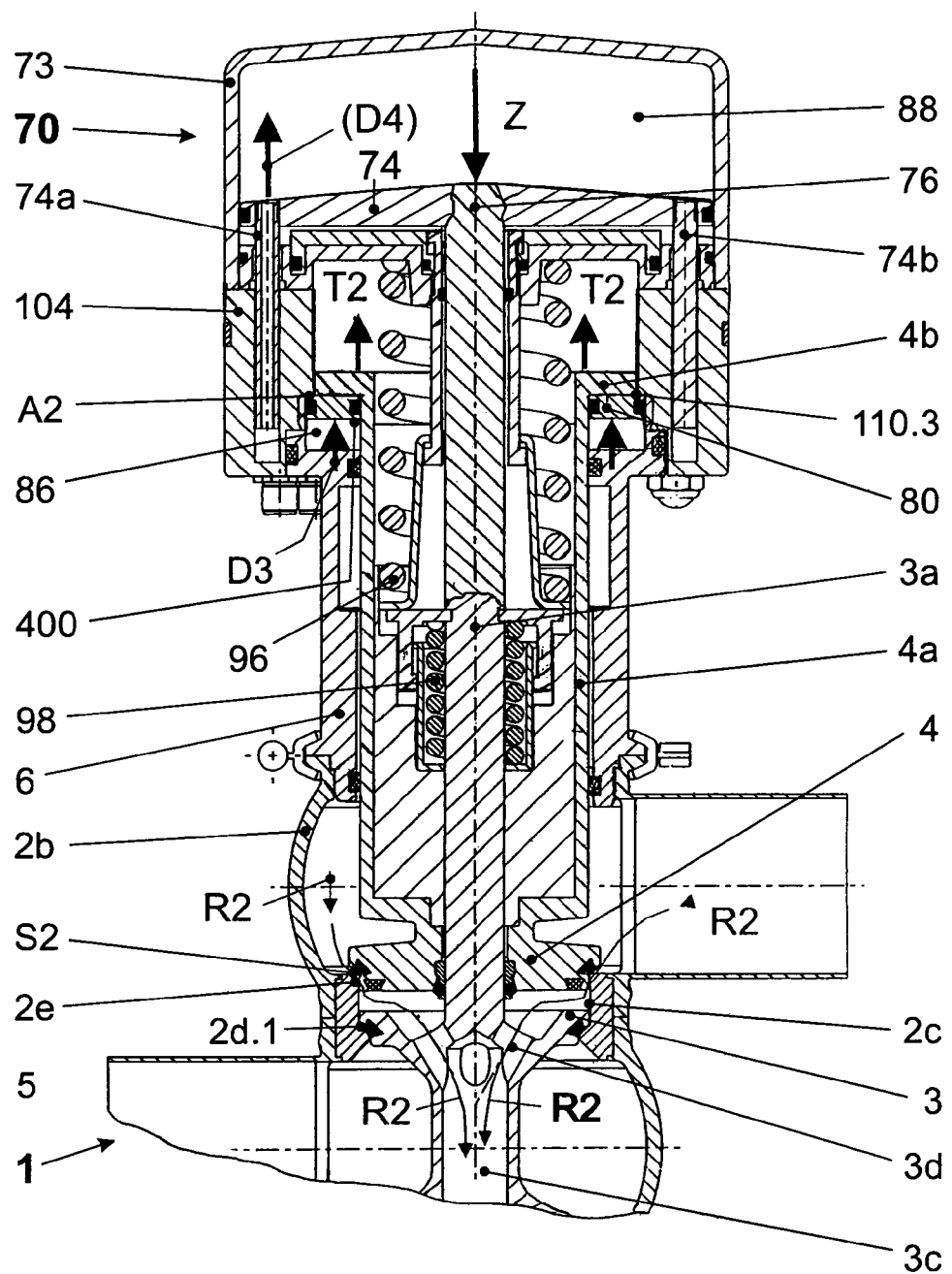
FIG. 1c the double seat valve according to FIG. 1, also in a meridian section, in a seat cleaning position of a second, upper, relative to the represented location, closing element with the respectively actuated drive and the control unit according to the invention.

A hollow rod 74*a* and a rod 74*b*, that are securely arranged in a diametrical arrangement in the radial outside region of the first drive piston 74, each engage in a movable and sealed manner through the housing floor 72, and then engage in a first blind hole 104*c* (hollow rod 74*a*) or respectively a second blind hole 104*d* (rod 74*b*) in the annular control unit 104, with radial play. The hollow rod 74*a* reaches completely through the first drive piston 74, so that a fourth pressure medium D4 (D4) can be supplied to the fourth pressure medium chamber 88 via a inner channel 74*a*.1 formed inside the hollow rod 74*a*. A supply in this regard, of the fourth pressure medium (D4) is necessary when with the double seat valve 1 of the second valve type, the first closing element 3 formed as a seat plate should be pressed on the first seat 2*d*.1 in its closed position with an additional force Z in addition to the pretensioning force of the first spring 96 acting in the closed position (FIG. 1*c*). With the double seat valve of the first valve type, the supply pressure medium D4 serves for generating a first partial stroke T1 of the first closing element 3 (FIG. 2*a*).

The rod 74*b* is intended to form, with its end facing away from the first drive piston 74, the respective position thereof between the closed position and the fully open position H. At least a first means for position detection or distance measurement 110.1 can be positioned in the control unit 104 so that this first means 110.1 delivers position indications from the end of the rod 74*b*. Furthermore, the control unit 104 can generally accommodate at least one first pilot valve 108.1 for controlling a pressure medium D, if an external supply is not provided for this purpose. As to an arrangement in this regard, reference is made to the FIGS. 3 and 4 and the associated description. The control unit 104 can also have, radially outside, thus, easily visible to an observer, at least one indicator light 104*a* (FIGS. 1 and 2*b*), which can be distinctive in a variety of geometric forms (circular or limited strips and therewith progressing axially or peripherally or strips progressing peripherally circumferentially) and optically displaying switching and/or other operating states of the double-seat valve 1.

An annular second drive piston 78 is arranged between the first drive piston 74 and the housing floor 72, is respectively axially movable radially outside and inside the housing floor and is guided sealed, so that a second pressure medium chamber 84 is formed between the housing floor 72 and the second drive piston 78. The second drive piston 78 has a limited axial stroke because it comes into abutment on the one side at a housing floor 72 fixed in location, and on the other side at a stop section 90*a* of the fixed sleeve 90, which acts as a first stop A1.1. In the scope of this limited stroke, starting from the closed position of the double seat valve 1, the first drive piston 74, upon pressurizing of the second pressure medium chamber 84, can be pushed with a second pressure medium D2 (see FIG. 1*b*) and thus also the first closing element 3, securely fastened thereto, upward by the first partial stroke T1 relative to the represented position. The first partial stroke T1 itself results after the second drive piston 78 arrives in a drive connection with the first drive piston 74, from the then present axial distance between the particular upper edge of the second drive piston 78 and the associated first stop A1.1. With the first partial stroke T1, the first closing element 3 is transferred into a first partially opening position T1, a first seat cleaning position, in which a first annular gap S1, acting as a throttle gap, is formed between a leakage cavity-side cylindrical attachment, not identified, on the first closing element 3, and the connection opening 2*c* (FIG. 1*b*), via which a first seat cleaning flow R1 from the first valve housing part 2*a* can arrive via the exposed first seat 2*d*.1 into the leakage cavity 5, and from there via the connection openings 3*d* and the drainage hole 3*c* into the surroundings of the double seat valve 1.

The second drive piston 78 and the housing floor 72 with the surrounding second pressure medium chamber 84 form a first individual adjusting apparatus 300 for generating the first partially open position T1. The first partially open position T1 is initiated from the closed position visible in FIG. 1 and is attained finally when the second pressure medium D2 is supplied via a path, not shown and identified, to the second pressure medium chamber 84 (FIG. 1*b*).

An annular third drive piston 80 is arranged in the drive-side face side of the lantern housing 6 (FIG. 1), is guided, respectively axial movable and sealed, radially outside in the lantern housing 6 and radially inside on the second adjusting rod 4*a* formed as a hollow rod, so that a third pressure medium chamber 86 is formed between the lantern housing 6 and the third drive piston 80 (see also FIG. 1*c*).

The third drive piston 80 has a limited axial stroke because it comes into abutment on one side at the lantern housing 6 that is fixed in location and on the other side at a radial setback, not identified, of the control unit 104, securely connected to the housing floor 72 that is fixed in location, wherein the radial setback functions as a third stop A2 (see FIGS. 1 and 1*c*). At the drive-side end of the second adjusting rod 4*a*, a recess section 4*b* is formed that, relative to the position shown and in the closed position of the double seat valve 1, ends with the lower edge thereof below the third stop A2 by a defined axial distance. In accordance with this axial distance, upon pressurization of the third pressure medium chamber 86 with a third pressure medium D3, the recess section 4*b* and thus the second closing element 4 securely connected to this via the second adjusting rod 4*a*, are pushed upward by a second partial stroke T2. With this second partial stroke T2, the second closing element 4 is transferred into a second partially open position T2, a second seat cleaning position, in which a second annular gap S2 acting as a throttle gap is formed between a leakage cavity-side cylindrical attachment, not identified, on the second closing element 4 and the connection opening 2*c*, via which a second seat cleaning flow R2 can arrive from the second valve housing part 2*b* via the exposed second seat 2*e* into the leakage cavity 5, and from there can arrive, via the connection openings 3*d* and the drainage hole 3*c*, into the surroundings of the double seat valve 1 (FIG. 1*c*).

The third drive piston 80 and the lantern housing 6 with the surrounding third pressure medium chamber 86, which can be pressurized with the third pressure medium D3, form a second individual adjusting arrangement 400 for generating the second partial opening T2. The second partially opening position T2 is initiated from the closed position seen in FIG. 1, and is finally attained when the third pressure medium D3 is supplied to the third pressure medium chamber 86 via a path, not represented and designated, (FIG. 1*c*).

The spring counter bearing 100*a* and a spring counter bearing recess 100*b* formed thereon are located in the axial extension region of the lantern housing 6 (FIG. 1) in a secure connection with the first adjusting rod 3*a*. The spring counter bearing recess engages movably, relative to the represented position, from below, in a spring housing 102, which is prevented from sliding out downward. The spring housing 102 accommodates a second spring 98, which is supported below at the spring housing 102 and above at the spring counter bearing 100*a*. The first spring 96 is located, as already described above, under pretensioning, between the housing floor 72 on the top side and the lower end of the movable sleeve 94 on the other. In the represented closed position of the double seat valve 1, the first closing element 3 is pressed, by means of the pretensioning generated in this closed position in the first spring 96, onto the first seat 2*d*.1 assigned thereto. Here, the force flow proceeds from the first spring 96 via the lower end of the movable sleeve 94 to the spring counter bearing 100*a*, and from there to the first adjusting rod 3*a*, and thus to the first closing element 3. In this closed position, the second spring 98 is also under a defined pretension, which presses the second closing element 4 also onto the assigned second seat 2*e* thereof. Here, the force flow in this regard, proceeds from the second spring 98, which is supported on the upper side at the spring counter bearing 100*a* and thus at the first adjusting rod 3*a*, and at the lower side at the lower end of the spring housing 102, via an insertion part 4*c* placed in the second adjusting rod 4*a* formed as a hollow rod, upon which in turn the spring housing 102 is supported on the lower side, to the second adjusting rod 4*a*, and thus to the second closing element 4. With the opening stroke and in the fully open position H (FIG. 1*a*) the first independently driven closing element 3 is lifted, against the pretensioning force of the first spring 96, from the assigned first seat 2*d*.1, and, as soon as the pick-up position of the second closing element 4 by the first closing element 3 has occurred, and the middle seal 12 between them has engaged, both closing element 3, 4 are pressed together by the pretensioning force then generated by the second spring 98, and sealed against each other.

Figure 3:
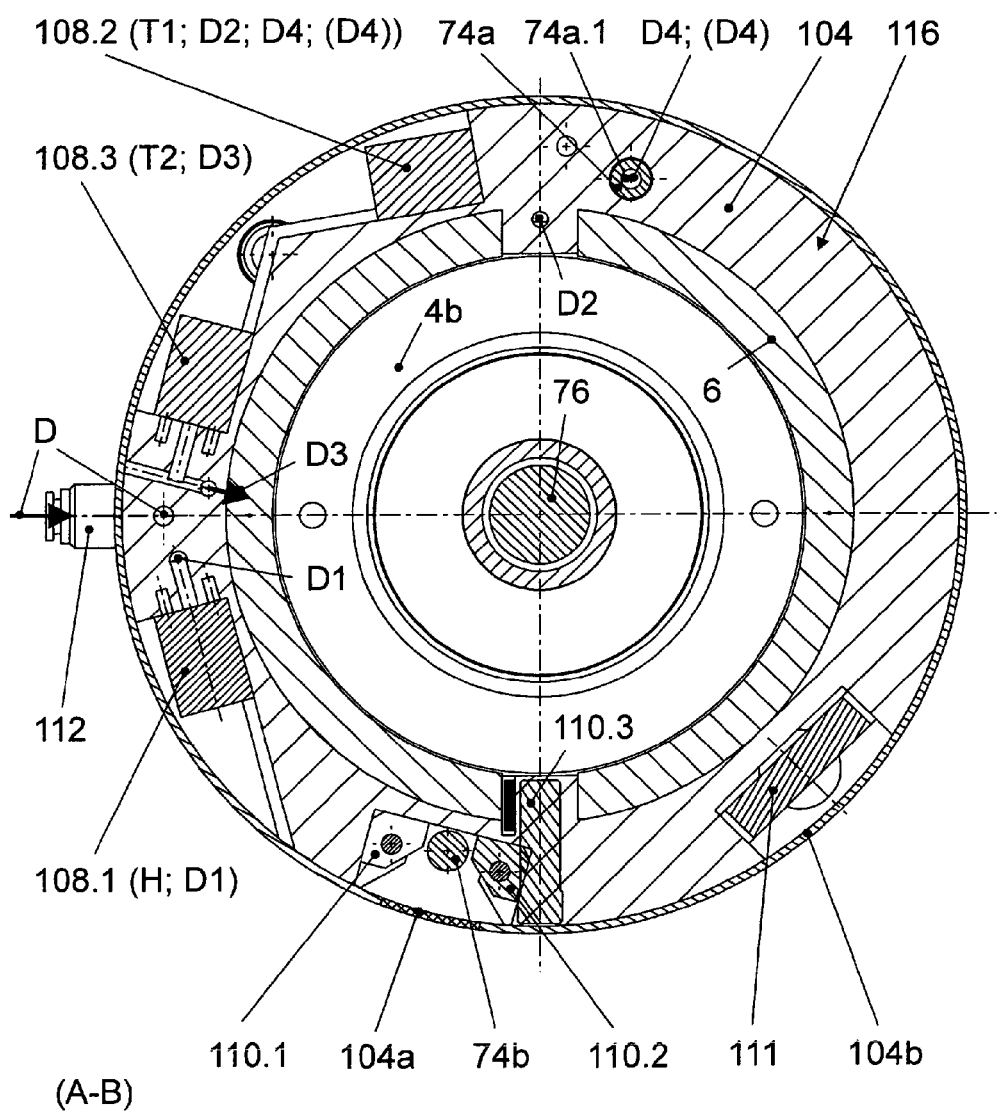
FIG. 3 a cross section through the double seat valve according to FIG. 1 with the drive and the control unit according to the invention, corresponding to a section proceeding as designated in FIG. 1b with A-B, and FIG. 4 a perspective representation of the control unit according to the invention corresponding to a configuration according to the FIGS. 1 to 2b, wherein the control unit, for representing the inserted position thereof in the drive, is bordered on one side by a first drive piston and on the other side by the lantern housing.
Figure 4:
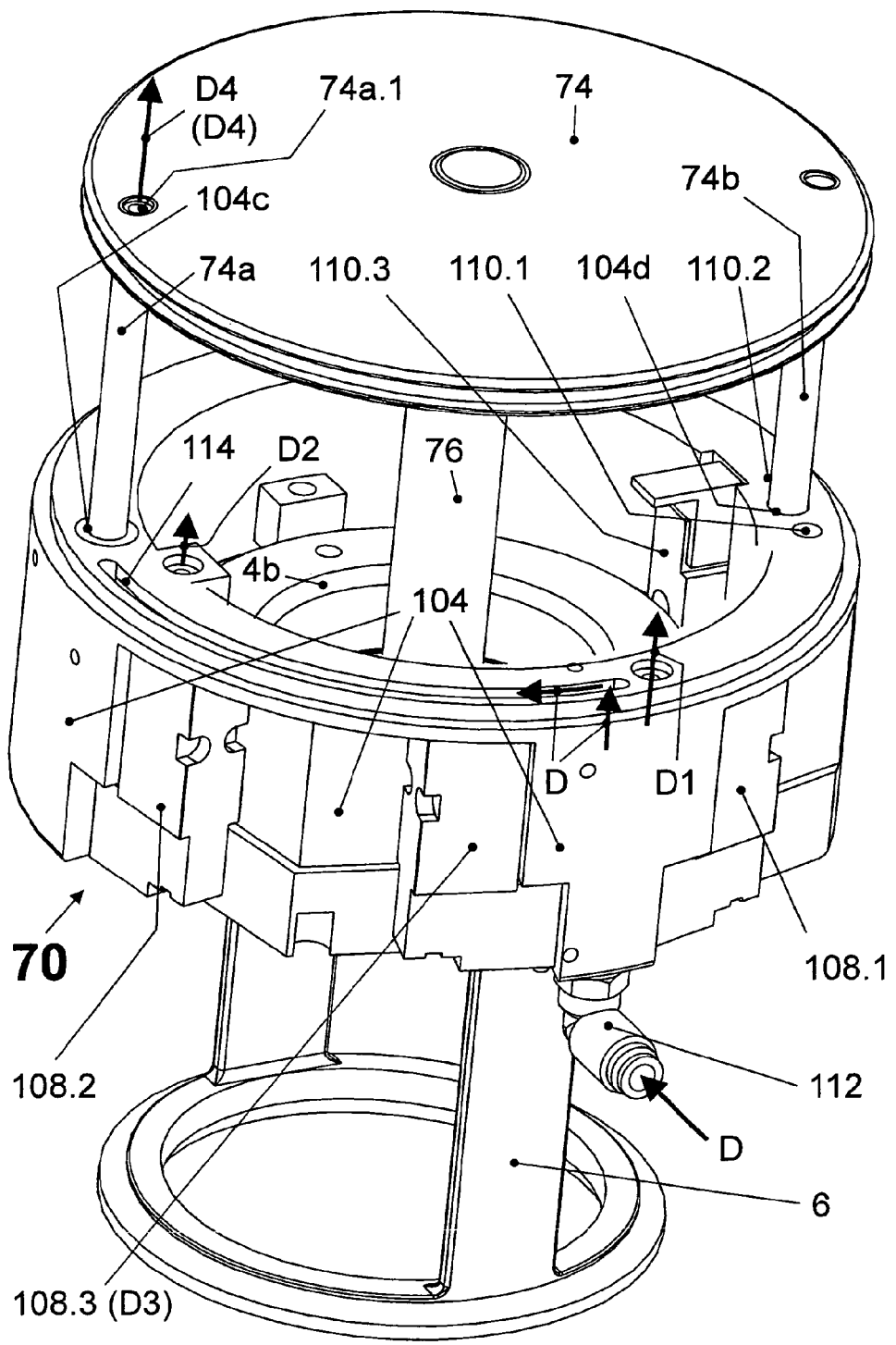

For controlling a double seat valve 1 fully capable of seat cleaning, at least three pilot valves 108.1, 108.2 and 108.3 are necessary, which can be arranged without any problem in the control unit 104 according to the invention, as shown in the FIGS. 3 and 4 together with the necessary, but not represented, paths for the respective supply and distribution of the pressure media D, D1 to D4, (D4). This is not true, however, when the control of the pressure medium occurs via an external control unit, and the supply of the same into the associated pressure medium chambers occurs from the surroundings of the double seat valve. More than just one means for detecting position or distance measurement, namely the first means 110.1 for the closed and fully open position H of the first closing element 3 (FIGS. 1, 1*a*), a second means 110.2 for the first partial stroke T1 of the first closing element 3 (FIG. 1*b*) and a third means 110.3 for the second partial stroke T2 (FIG.

1c), are required for monitoring a double seat valve 1 capable of seat cleaning, which again can be arranged without problems with the associated, not shown, signal lines and connection means, and also means, not shown, of control logic 111 in the control unit 104 according to the invention (FIGS. 3 and 4). It should be noted here that the position detection or distance measurement at the second closing element 4 does not occur indirectly on the path of the position detection at the first closing element 3, or directly via means, which are preferably arranged in the region of the lantern housing 6 accessible from outside, as occurs in general up to now in both cases in the state of the technology for reducing the constructive expenditure, rather originally and expediently at the second adjusting rod 4a, connected securely to the second closing element 4, or a component in secure connection thereto, such as for example the recess section 4b, the position of which can be detected by the third means 110.3. As shown further in FIG. 3, the means of a control logic 111 can also be arranged in the control unit 104 without problems. Furthermore, with a closed annular control unit 104 there is still sufficient unused construction space available in order to arrange, for example a NOT element 116, with which if needed, when the first drive piston 74 is not actuated, the fourth pressure medium (D4) can be selectively guided onto the back side of the first drive piston 74, and thus into the fourth pressure medium chamber 88 for supporting the spring force of the first spring 96 with the additional force Z (FIG. 1c).

The design of a double seat valve 1 capable of seat cleaning of the first valve type (FIG. 2) differs from one of the second valve type in that the first closing element 3 is formed as a slide piston, which in the closed position of the double seat valve 1 is accommodated in a sealed manner in a first seat 2d.2, which is implemented as a cylindrical seat, and is formed by the connection opening 2c. For this purpose a seat seal 10 is provided in the slide piston 3 that interacts with the first seat 2d.2 exclusively through radial pretension (radial seal in sliding engagement). The seat and closing element configuration of the second closing element 4 corresponds to that of the double seat valve 1 of the second valve type. This includes also the middle seal 12 in the second closing element 4, which in each open position of the two closing elements 3, 4 provides a secure seal of the leakage cavity 5 with respect to the interior of the valve housing 2.

The drive 70 according to the invention for actuating a double seat valve 1 of the first valve type can be used without restriction also for a double seat valve 1, with which the first closing element 3 is also formed as a slide piston, however a middle seal 12 is omitted with the second closing element 4. In contrast to the first valve type with middle seal 12 described above, with this modified first valve type, the second closing element 4 for substitution of the middle seal 12 now has at the end thereof facing the first closing element 3 a recess with a substantially cylindrical peripheral wall aligning with the cylindrical first seat 2d.2, and the recess is dimensioned so that during the opening movement it accommodates the end section and the radial first seat seal 10 of the first closing element 3 in a sealing manner before the second closing element 4 opens. The prototype of such a double seat valve 1 is known from the document EP 0 039 319 B1.

The only change in the drive 70 according to the invention for the double seat valve 1 of the first valve type (first configuration of the drive 70) compared to the drive 70 according to the invention in the second configuration results in that the drive 70 must take into account the need that due to the construction of the first closing element 3 as a slide piston, now the first partially opening position T1 thereof for attaining the first seat cleaning position has to occur downward, relative to the represented position, by a first partial stroke T1, (FIG. 2a). For this reason the second drive piston 78, and the stop section 90a limiting the upward stroke thereof can be eliminated without replacement. Due to the omission of the second drive piston 78 and the stop section 90a, a degree of freedom of movement downward results for the first drive piston 74 (see FIG. 2). This degree of freedom of movement is to be dimensioned so that the necessary first partial stroke T1 is generated (see configuration of the drive 70) by the now possible downward movement of the first drive piston 74 from the closed position of the double seat valve 1 and due to pressurizing the fourth pressure medium chamber 88 with the fourth pressure medium D4. The first partial stroke T1 is limited by a second stop A1.2 (FIGS. 2, 2a) formed on the housing floor 72. Through the now downward directed first partial stroke T1, the first closing element 3 is transferred into the first partially open position T1, the first seat cleaning position, in which the first annular gap S1, acting as a throttle gap, is formed between a leakage cavity-side cylindrical attachment, not identified, on the first closing element 3 and the cylindrical first seat 2d.2 in the connection opening 2c, via which the first seat cleaning flow R1 can arrive from the first valve housing part 2a via the exposed first seat 2d.2 into the leakage cavity 5, and from there via the connection openings 3d and the drainage hole 3c into the surroundings of the double seat valve 1. The performance of the first partial stroke T1 is signaled via second means 110.2.

In the scope of the first configuration of the drive 70 according to the invention, and thus for a double seat valve 1 of the first valve type, the first drive piston 74 and the housing cover part 73, together with the surrounding fourth pressure medium chamber 88, form the first individual adjusting arrangement 300 for generating the first partially open position T1. The first partially open position T1 is initiated from the closed position visible in FIG. 2, and subsequently attained when the fourth pressure medium chamber 88 is supplied the fourth pressure medium D4 via the inner channel 74a.1 and a path feeding this, not shown and indicated, (FIG. 2a).

The axial fixing of the first closing element 3, formed as a slide piston, in the closed position thereof, that fundamentally can take on this closed position in each axial position within the cylindrical seat 2d.2, occurs in that the movable sleeve 94 under the pretensioning of the first spring 96 is located in the lower end position thereof, and thus forms a stop above for the spring counter bearing 100a and thus for a first adjusting rod 3a and the first closing element 3 connected thereto, wherein now the spring counter bearing 100a with the pretensioning force generated in this position by the second spring 98 is pressed against this stop. The second spring 98 is supported on the other side thereof indirectly via the second closing element 4 resting on the second seat 2e thereof on the path via the spring housing 102, the insertion part 4c and the second adjusting rod 4a.

The FIGS. 3 and 4 show as an example how the arrangement of the components can be provided within the control unit 104 according to the invention in a fully equipped double seat valve 1 capable of seat cleaning. The pressure medium D centrally supplied from outside to the control unit 104, and thus to the drive 70, arrives via a pressure medium connection 112 and via a channel, not shown, running in an axial direction into a distribution channel 114 (FIG. 4), out of which the pilot valves 108.1, 108.2 and 108.3 are supplied with pressure medium D. The first pilot valve 108.1 causing the complete opening stroke H controls and pressurizes a channel, not shown, with the first pressure medium D1, which arrives in the first pressure medium chamber 82 (FIGS. 1a, 2). The second pilot valve 108.2 generating the first partially open position T1 for the double seat valve 1 of the second valve type, controls and pressurizes a channel, not indicated, with the second pressure medium D2, which exits into the second pressure medium chamber 84 (FIGS. 3, 4 and 1b). With the double seat valve 1 of the first valve type (FIG. 2a) the first partial stroke T1 is caused by the fourth pressure medium D4, which arrives via the inner channel 74a.1 running in the hollow rod 74a into the fourth pressure medium chamber 88 above the first drive piston 74 (FIGS. 4, 3). The third pilot valve 108.3 generating the second partial stroke T2 controls and pressurizes a channel, not indicated, with the third pressure medium D3, which exits into the third pressure medium chamber 86 (FIGS. 3, 1c). For optional pressurization of the back side of the first drive piston 74 for generating an additional force Z onto the first closing element 3 located in the closed position thereof, the second pilot valve 108.2, in connection with the NOT element 116, controls the inner channel 74.1 of the hollow rod 74a, so that the fourth pressure medium chamber 88 is pressurized with the fourth pressure medium (D4) (Note: ( ) indicates the additional force due to D4) (FIGS. 1, 1c).

Furthermore, the control unit 104 offers space for the means of the control logic 111 (FIG. 3). The position of the first closing element 3 is represented by means of the rod 74a in the control unit 104. First means 110.1 fastened to a rod, not indicated, signal the completion of the closed and the fully open position H. Second means 110.2 fastened to a further rod, not indicated, signal the completion of the first partial stroke, or respectively the first partially open position T1 (first closing element 3). Third means 110.3, which detect the position of the recess section 4b that forms the respective position of the second closing element 4, signal the completion of the second partial stroke, or respectively the second partially open position T2 (second closing element 4). The aforementioned means 110.1 to 110.3 can be contactless sensors, which register the change of a magnetic field, wherein the respective magnetic field is generated in each case by at least one permanent magnet fastened to the rod 74b or the recess section 4b.

For protecting the control unit 104 against external influences, the control unit can be enclosed with a jacket 104b, which is metallic for example. The indicator lights 104a described in the different embodiments above, are either visible behind transparent windows in the jacket 104b or they are integrated with at least the outer edge thereof in the jacket 104b, for example.

It is understood, that the drive 70 according to the invention is also suitable for a double seat valve of the first or the second valve type, with which in each case both seat cleaning positions (first and second partially open position T1, T2) are not required or desired. In these cases all components, above all, the second and the third drive pistons 78, 80 and the means for control and pressurizing the pressure medium chambers assigned to the drive pistons 78, 80 with pressure medium, which account for the functioning of the first and the second individual adjusting arrangement 300, 400 are eliminated when these components are not absolutely necessary in the scope of the main adjusting apparatus 200 or generating an additional force Z for supporting the first spring 96.

Both the drive 70 and the control unit 104 each represent an independent inventive solution. The drive 70 according to the invention can also be implemented without the control unit 104 according to the invention if the latter concerns the internal design as described in the aforementioned manner with the first and second control means in the scope of claim 8. And conversely, the control unit 104, if it relates to the inventive placement thereof, can be arranged at any drive for the double seat valve, if this is appropriately modified.

The inventive drive 70 alone, that is, without the control unit 104 described above with the internal features in the scope of claim 8, can also in the conventional manner be provided with a control unit arranged on the side of the drive 70 facing away from the valve housing 2, as is described in the introduction of the description in the documents of the prior art cited in this regard. In this case, with regard to detecting position of the first adjusting rod 3a, the latter must be elongated indirectly beyond the piston rod 76, and must be guided movably sealed through the head region of the housing cover part 73. The pressure medium chambers are then to be connected in the known manner at assigned paths for the respective pressure medium.

This completes the description of the preferred and alternate embodiments of the invention. Those skilled in the art may recognize other equivalents to the specific embodiment described herein which equivalents are intended to be encompassed by the claims attached hereto.

REFERENCE LIST OF THE ABBREVIATIONS 1 double seat valve
2 valve housing
2a first valve housing part
2b second valve housing part
2c connecting opening
2d.1 first seat
2d.2 cylindrical first seat
2e second seat (radial; conical; planar and orthogonal to the longitudinal axis)
3 first closing element (seat plate or slide piston)
3a first adjusting rod
3b tube shaft (first compensation piston)
3c drainage hole
3d connecting opening
4 second closing element (seat plate or slide piston)
4a second adjusting rod (hollow rod, second pressure compensation piston)
4b recess section
4c insertion part
5 leakage cavity
6 lantern housing
8 seat ring
9 clamping ring
10 first seat seal (radially sealing)
11 second seat seal
12 middle seal
13 first rod seal
14 second rod seal
17 housing ring
70 drive
71 housing
72 housing floor
73 housing cover part
74 first drive piston
74a hollow rod
74a.1 inner channel
74b rod
76 piston rod
78 second drive piston
80 third drive piston
82 first pressure medium chamber
84 second pressure medium chamber
86 third pressure medium chamber 88 fourth pressure medium chamber
90 fixed sleeve
90a stop section
94 movable sleeve
96 first spring
98 second spring
100a spring counter bearing
100b spring counter bearing recess
102 spring housing
104 control unit
104a indicator light
104b jacket
104c first blind hole
104d second blind hole
106 fastening means
108.1 first pilot valve (main stroke H; D1)
108.2 second pilot valve (first partial stroke T1; D2; D4))
108.3 third pilot valve (second partial stroke T2; D3)
110.1 first means for position detection or distance measurement (first closing element; closed position, open position H)
110.2 second means for position detection or distance measurement (first closing element; seat cleaning below; first partial stroke, or respectively first seat cleaning position T1)
110.3 third means for position detection or distance measurement (second closing element; seat cleaning above; second partial stroke, or respectively second seat cleaning position T2)
111 means of a control logik
112 pressure medium connection
114 distribution channel
116 NOT element
200 main adjusting arrangement
300 first individual adjusting arrangement
400 second individual adjusting arrangement
A1.1 first stop (for first partial stroke T1 of the second valve type)
A1.2 second stop (for first partial stroke T1 of the first valve type)
A2 third stop (for second partial stroke)
D pressure medium (general)
D1 first pressure medium (main stroke, fully open stroke H)
D2 second pressure medium (first partial stroke T1 with second valve type; FIG. 1b)
D3 third pressure medium (second partial stroke T2)
D4 fourth pressure medium (first partial stroke T1 with first valve type; FIG. 2a)
(D4) fourth pressure medium for generating an additional force Z (second valve type; FIG. 1 c)
H open position (open stroke; fully open position; main stroke)
R1 first seat cleaning flow
R2 second seat cleaning flow
S1 first annular gap
S2 second annular gap
T1 first partial stroke (first partial opening)
T2 second partial stroke (second partial opening)
Z additional force

The invention claimed is:

1. A double seat valve having a drive (70) for switching the valve, the valve having a first (3) and a second closing element (4) within a valve housing that are movable independently of each other, wherein the first and second closing elements (3, 4) enclose a leakage cavity (5) that is connected to a surrounding area of the double seat valve (1), wherein the first closing element (3) after a partial stroke comes into abutment with the second closing element (4) and transfers the second closing element (4) by its further opening movement into an open position (H), adjusting rods (3a, 4a) for the closing elements (3, 4) being provided, wherein a first adjusting rod (3a) is arranged inside a second adjusting rod (4a), which are extended from the valve housing (2) outwards into a drive (70), and via which the closing elements (3, 4), in addition to the fully open position (H) of the closing elements, are adjustable independently of each other, in that the first closing element (3) is movable selectively into a first partial opening (T1) and the second closing element (4) is movable selectively into a second partial opening (T2), wherein the open position (H) is generated by a main adjusting arrangement (200), and the first partial opening (T1) is generated by first and second individual adjusting arrangements (300, 400) assigned to the respective closing elements (3, 4), the individual adjusting arrangements (300, 400) being arranged on the one hand between the main adjusting arrangement (200) and the valve housing (2) and on the other hand being arranged together with the main adjusting arrangement (200) in a housing (71) of the drive (70), the drive having a first drive piston (74) for the main adjusting arrangement (200) that engages in the direction of the associated fully open position (H), the first adjusting rod (3a) being connected to the first closing element (3) against the force of a spring (96), and the drive having an additional drive piston (80) for the second of the individual adjusting arrangements (400) for actuation of the second closing element (4), the additional drive piston (80) being adapted to be brought in engagement with the second adjusting rod (4a) of the second closing element (4), when moved into the second partial opening (T2), the first drive piston (74) on the side thereof facing the valve housing (2) being delimited by a first pressure medium chamber (82) for generating the fully open position (H), and on the side of the additional drive piston (80) facing away from the first pressure medium chamber (82), a second pressure medium chamber (86) being provided for generating the second partial open position (T2), wherein:

the first drive piston (74) is fixedly connected directly or indirectly to the first adjusting rod (3a), the first pressure medium chamber (82) is delimited on one side by the first drive piston (74) and is delimited on the other side by a housing floor (72) in the housing (71) transverse to a longitudinal axis of the drive (70), the drive (70) designed with the double seat valve (1) having the first closing element (3) formed as a slide piston and the second closing element (4) formed as a seat plate, having on the side of the first drive piston (74) facing away from the valve housing (2) a third pressure medium chamber (88) for generating the first partial open (T1), wherein the first drive piston (74) by the first of the individual adjusting arrangements (300) for the first closing element (3), is pushed in an axial direction out of the closed position of the double seat valve (1) into the first partial open position (T1) opposite to the movement direction for obtaining the open position (H).

2. The double seat valve having a drive (70) for switching the valve according to claim 1 wherein:
the spring (96) is arranged between the housing floor (72) and the valve housing (2), and in each case engages directly or indirectly on one side at the housing floor (72) and on the other side at the first adjusting rod (3a).

3. The double seat valve having a drive (70) for switching the valve according to claim 1, wherein the housing (71), in a housing section thereof facing toward the valve housing (2), is formed by a control unit (104), which in an axial extension region of the drive (70) forms a radial outside part of said drive.

4. The double seat valve having a drive (70) for switching the valve according to claim 3, wherein the control unit (104) is positioned within a largest outer radial dimension of the drive (70), wherein this dimension solely is defined by components of the drive (70) mechanically defining the kinematics of the drive (70).

5. The double seat valve having a drive (70) for switching the valve according to claim 3, wherein the control unit (104) is annular.

6. The double seat valve having a drive (70) for switching the valve according to claim 3, wherein the control unit 104 is arranged on the side of the housing floor (72) facing the valve housing (2) and is connected thereto in a form-locking and/or friction-locked manner.

7. The double seat valve having a drive (70) for switching the valve according to claim 3, wherein the control unit (104) accommodates connections and passages for controlling a pressure medium (D; D1, D2, D3; D4, (D4)) for pressurizing the pressure medium chambers (82, 84, 86, 88) through at least one pilot valve (108.1), the control unit inludes connections, electrical lines and signal lines for at least one first position detection or distance measurement mechanism (110.1) and means for control logic (111).

8. The double seat valve having a drive (70) for switching the valve according to claim 3, wherein in the first drive piston (74) a hollow rod (74*a*) is securely anchored which, starting from the first drive piston (74), penetrates movably and sealably through the housing floor (72), engages movably a first blind hole (104*c*) in the control unit (104) and ends there, wherein a channel (74*a*.1) is inside the hollow rod (74*a*) completely penetrating the hollow rod (74*a*) and connecting the third pressure medium chamber (88) to the first blind hole (104*c*) in a manner to pass fluid, the first blind hole (104*c*) supplied by a pressure medium (D4; (D4)).

9. The double seat valve having a drive (70) for switching the valve according to claim 3, wherein in the first drive piston (74) a rod (74*b*) is securely anchored which, starting from the first drive piston (74), penetrates movably and sealably through the housing floor (72), engages movably a second blind hole (104*d*) in the control unit (104) and ends there, the rod (74*b*) being assigned to a position detection or distance measurement mechanism (110.1).

10. The double seat valve having a drive (70) for switching the valve according to claim 9, wherein a hollow rod (74*a*) and the rod (74*b*) are arranged diametrically in the first drive piston (74).

11. The double seat valve having a drive (70) for switching the valve according to claim 3, wherein a position detection or distance measurement mechanism (110.3) is arranged in the control unit (104) and assigned to the drive-side end of the second adjusting rod (4*a*).

12. A double seat valve having a drive (70) for switching the valve, the valve having a first (3) and a second closing element (4) within a valve housing that are movable independently of each other, wherein the first and second closing elements (3, 4) enclose a leakage cavity (5) that is connected to a surrounding area of the double seat valve (1), wherein the first closing element (3) after a partial stroke comes into abutment with the second closing element (4) and transfers the second closing element (4) by its further opening movement into an open position (H), adjusting rods (3*a*, 4*a*) for the closing elements (3, 4) being provided, wherein a first adjusting rod (3*a*) is arranged inside a second adjusting rod (4*a*), which are extended from the valve housing (2) outwards into a drive (70), and via which the closing elements (3, 4), in addition to the fully open position (H) of the closing elements, are adjustable independently of each other, in that the first closing element (3) is movable selectively into a first partial opening (T1) and the second closing element (4) is movable selectively into a second partial opening (T2), wherein the open position (H) is generated by a main adjusting arrangement (200), and the first partial opening (T1) is generated by first and second individual adjusting arrangements (300, 400) assigned to the respective closing element (3, 4), the individual adjusting arrangements (300, 400) being arranged on the one hand between the main adjusting arrangement (200) and the valve housing (2) and on the other hand being arranged together with the main adjusting arrangement (200) in a housing (71) of the drive (70), the drive having a first drive piston (74) for the main adjusting arrangement (200) that engages in the direction of the associated fully open position (H), the first adjusting rod (3*a*) being connected to the first closing element (3) against the force of a spring (96), and the drive having a third drive piston (80) for the second of the individual adjusting arrangements (400) for actuation of the second closing element (4), the third drive piston (80) being adapted to be brought in engagement with the second adjusting rod (4*a*) of the second closing element (4), when moved into the second partial opening (T2), the first drive piston (74) on the side thereof facing the valve housing (2) being delimited by a first pressure medium chamber (82) for generating the fully open position (H), and on the side of the third drive piston (80) facing away from the first pressure medium chamber (82), a third pressure medium chamber (86) being provided for generating the second partial open position (T2), wherein:

the first drive piston (74) is fixedly connected directly or indirectly to the first adjusting rod (3*a*), the first pressure medium chamber (82) is delimited on one side by the first drive piston (74) and is delimited on the other side by a housing floor (72) in the housing (71) transverse to a longitudinal axis of the drive (70), the drive (70), designed with the double seat valve (1) having the two closing elements (3, 4) formed as seat plates, having in the housing floor (72) on the side of the first drive piston (74) a second drive piston (78), which is axially movable so that it forms, together with the housing floor (72), a second pressure medium chamber (84) for the first of the individual adjusting arrangements (300) for the first closing element (3) to generate the first partial opening (T1), the second drive piston (78) being moved into the first partial opening (T1) in the direction of movement to obtain the fully open position (H) by engaging in a driving connection the first drive piston (74).

\* \* \* \* \*